US009613214B2

(12) United States Patent
Dover

(10) Patent No.: US 9,613,214 B2
(45) Date of Patent: Apr. 4, 2017

(54) SELF-MEASURING NONVOLATILE MEMORY DEVICES WITH REMEDIATION CAPABILITIES AND ASSOCIATED SYSTEMS AND METHODS

(71) Applicant: Micron Technology, Inc., Boise, ID (US)

(72) Inventor: Lance W. Dover, Citrus Heights, CA (US)

(73) Assignee: Micron Technology, Inc., Boise, ID (US)

( * ) Notice: Subject to any disclaimer, the term of this patent is extended or adjusted under 35 U.S.C. 154(b) by 245 days.

(21) Appl. No.: 13/937,887

(22) Filed: Jul. 9, 2013

(65) Prior Publication Data

US 2015/0019793 A1    Jan. 15, 2015

(51) Int. Cl.
    *G06F 12/00*    (2006.01)
    *G06F 21/57*    (2013.01)

(52) U.S. Cl.
    CPC ........ *G06F 21/57* (2013.01); *G06F 2221/034* (2013.01)

(58) Field of Classification Search
    CPC .............................. G06F 21/575; G06F 21/57
    USPC ..................... 713/2, 176; 711/103
    See application file for complete search history.

(56) References Cited

U.S. PATENT DOCUMENTS

| | | | | |
|---|---|---|---|---|
| 5,844,986 | A * | 12/1998 | Davis | G06F 21/572 |
| | | | | 713/187 |
| 5,937,063 | A * | 8/1999 | Davis | 713/187 |
| 6,625,730 | B1 | 9/2003 | Angelo et al. | |
| 7,917,741 | B2 * | 3/2011 | Dutton et al. | 713/1 |
| 2007/0300207 | A1 * | 12/2007 | Booth | G06F 21/575 |
| | | | | 717/126 |
| 2008/0022108 | A1 * | 1/2008 | Brannock et al. | 713/176 |
| 2009/0327678 | A1 * | 12/2009 | Dutton | G06F 21/00 |
| | | | | 713/2 |
| 2012/0042376 | A1 * | 2/2012 | Dolgunov et al. | 726/19 |
| 2012/0284772 | A1 * | 11/2012 | Kwon et al. | 726/2 |
| 2014/0089651 | A1 * | 3/2014 | Yao | H04L 9/3247 |
| | | | | 713/2 |

* cited by examiner

*Primary Examiner* — Prasith Thammavong
*Assistant Examiner* — Edmund Kwong
(74) *Attorney, Agent, or Firm* — Perkins Coie LLP

(57) ABSTRACT

Several embodiments of systems incorporating nonvolatile memory devices are disclosed herein. In one embodiment, a system can include a central processor (CPU) and a nonvolatile memory device operably coupled to the CPU. The nonvolatile memory device can include a memory that stores pre-measurement instructions that are executable by the nonvolatile memory upon startup, but not executable by the CPU upon startup. In operation, the pre-measurement instructions direct the nonvolatile memory to take a measurement of at least a portion of its contents and to cryptographically sign the measurement to indicate that the measurement was taken by the nonvolatile memory device. In one embodiment, the CPU can use the measurement to determine whether the nonvolatile memory device is trustworthy.

15 Claims, 3 Drawing Sheets

SELF-MEASURING NONVOLATILE MEMORY DEVICES WITH REMEDIATION CAPABILITIES AND ASSOCIATED SYSTEMS AND METHODS

TECHNICAL FIELD

The present disclosure is related to nonvolatile memory devices and systems. For example, the present disclosure is related to nonvolatile memory that stores a boot block of a basic input/output system (BIOS).

BACKGROUND

Upon system boot, a computer system executes a startup routine to self-test, identify, and initialize devices, memory, and other components of the system. Computer systems typically store the startup routine in nonvolatile memory, such as at an electrically erasable programmable read only memory (EEPROM) chip. The memory location of the startup routine is commonly referred to as the "boot block."

In general, a computer system implicitly trusts the boot block, and, thus, the computer system implicitly trusts the startup routine contained by the boot block. As a result, corrupted startup routines, such as those created by malicious programmers, can exploit this trust to corrupt the computer system.

DETAILED DESCRIPTION

Figure 1:
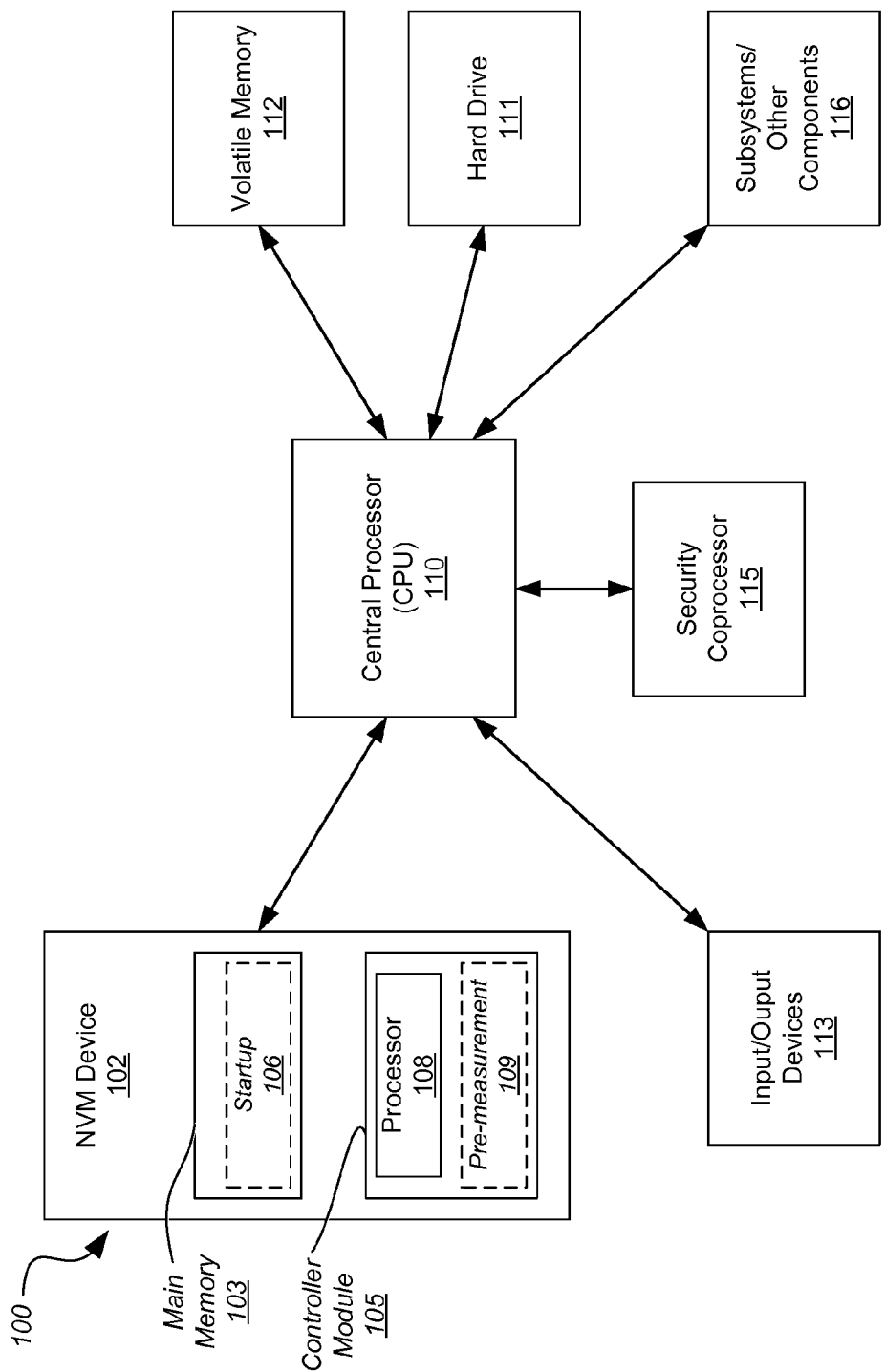
FIG. 1 is a block diagram of a computer system that includes a nonvolatile memory device configured in accordance with an embodiment of the present technology.

As discussed in greater detail below, the technology disclosed herein relates to nonvolatile memory configured to identify whether a startup routine can be implicitly trusted. In conventional computer systems, a central processing unit (CPU) controls operations of the various components of the system, including its nonvolatile memory. When the system is powered on, the CPU executes a startup routine stored at the boot block of the nonvolatile memory. In some instances, the startup routine can instruct the CPU to carry out malware error-detection to reduce the likelihood that the CPU will execute malicious, defective, or otherwise corrupted code. As part of the malware error-detection, the startup routine can instruct the CPU to take a measurement of the contents of the boot block to compare this measurement with an expected hash value. The CPU can determine whether or not to trust the boot block based on whether the measurement and the expected value accord with one another. However, because the CPU itself executes the error detection measurement, this does not mean that the boot block is necessarily trustworthy. For example, the startup routine can be corrupted such that it instructs or causes the CPU to bypass malware error-detection (by, e.g., faking out the CPU). Nonvolatile memory configured in accordance with several embodiments of the present technology, however, address these and other limitations of conventional computer systems.

One embodiment of the present technology includes a computer system having a nonvolatile memory that self-assesses its core root of trust for measurement (CRTM) (e.g., the BIOS boot block code). In particular, the nonvolatile memory executes its own pre-measurement instructions upon startup. Because the nonvolatile memory itself executes the pre-measurement instructions, as opposed to the CPU or other system components, the system does not rely on the CPU-executed startup routine to take measurements of the contents of the nonvolatile memory (i.e., measurements of the CRTM of the nonvolatile memory). Once the nonvolatile memory measures itself and then cryptographically signs the measurement, it can communicate the measurement to other components of the system, such as the CPU. For example, during the startup process, the CPU can request the authenticated measurement from the nonvolatile memory and then store the measurement in a memory register within the CPU or at another location in the system. The CPU and/or other system components can compare the authenticated measurement against an expected value (i.e., a "golden value") to determine whether the nonvolatile memory and its contents are trustworthy. In some embodiments, the CPU executes one or more remediation measures when the pre-measurement indicates that the nonvolatile memory is untrustworthy. These remediation measures can include, for example, notifying a user, executing a different startup routine, shutting down the computer system, etc.

In another embodiment, the nonvolatile memory can flag itself instead of the CPU or other system components determining the trustworthiness of the nonvolatile memory. For example, after carrying out the pre-measurement, the nonvolatile memory can compare the measurement with an expected value and can, e.g., set a register value, output a certain value, or otherwise indicate to the CPU or other system components that it is trustworthy (or untrustworthy). In selected embodiments, the nonvolatile memory also carries out remediation measures. For example, the nonvolatile memory can disable read and/or write access, respond with an alternate boot block image, or take other suitable action.

FIG. 1 is a block diagram of a computer system 100 having a nonvolatile memory device or system 102 ("NVM device 102") configured in accordance with an embodiment of the present technology. The NVM device 102 includes a main memory 103 and a controller module 105. The main memory 103 and the controller module 105 can be configured, for example, as flash memory, read only memory (ROM), electrically erasable programmable ROM (EEPROM), erasable programmable ROM (EPROM), or other suitable memory, such as ferroelectric, magnetoresitive, or phase change memory. In general, the main memory 103 can include addressable memory cells that individually or collectively store data, program code, etc. In the illustrated embodiment, the main memory 103 stores startup instructions 106 that the system 100 can execute for system boot or other initialization processes. In one embodiment, the startup instructions 106 can include conventional start-up code stored in a boot block (not shown in FIG. 1) of the main memory 103.

The controller module 105 includes a processor 108, such as a microcontroller, special purpose logic circuitry (e.g., a field programmable gate array (FPGA)), an application specific integrated circuit (ASIC), etc.), or another suitable processor. In one aspect of this embodiment, the controller module 105 is configured to execute pre-measurement instructions 109 via the processor 108. For example, the controller module 105 can store microcode that the microcontroller can execute to carry out the pre-measurement instructions 109. As described in greater detail below, the controller module 105 executes the pre-measurement instructions 109 to measure the content stored in memory of the NVM device 102, such as content stored in the main memory 103 and/or content stored in dedicated memory within the controller module 105 (not shown in FIG. 1). The controller module 105 can also carry out other functions as well as interface with external components, such as a CPU. For example, the controller module 105 can address and access (e.g., read, write, erase, etc.) individual memory cells of the main memory 103 based on instructions from a CPU.

In the illustrated embodiment, the system 100 further includes a CPU 110, a hard drive 111 (e.g., a solid state drive and/or a disk drive), a volatile memory 112, input/output devices 113 (e.g., a display, touchscreen, keypad, keyboard, mouse, etc.), and a security coprocessor 115. In some embodiments, the system 100 can include other components 116, such as an Ethernet adaptor, a wireless transmitter, other processors or memory, etc. The CPU 110 can include, for example, one or more general purpose, application specific, or other programmed processors. The security coprocessor 115 can store encryption algorithms, cryptographic keys, or other suitable security technology. For example, after system boot, the security coprocessor 115 can securely store hash values, employ cryptographic techniques, or carry out other security procedures to verify the validity of program code. In one embodiment, the security coprocessor 115 implements the trusted platform module (TPM) specification (ISO/IEC 11889) of the Trusted Computing Group. In another embodiment, the security coprocessor 115 operates based on proprietary, application specific, or other suitable procedures. For example, the security coprocessor 115 can be suited for mobile devices in general or for a particular mobile device type or device manufacturer. In some embodiments, the CPU 110 and the security coprocessor 115 can be located on the same chip.

In general, the CPU 110 handles data processing of the system 100, which includes executing various program code stored at the NVM device 102, the hard drive 111, and the volatile memory 112. The NVM device 102 stores permanent (or semi-permanent) information, such as boot and runtime services, system configurations, and power management information. The hard drive 111 also stores permanent information, which can include, for example, executable files, databases, multimedia content, etc. The volatile memory 112, on the other hand, stores temporary information, such as program code, cache, buffered data, etc. Typically this information can be retained in the volatile memory 112 until the CPU 110 requests to erase or overwrite the information or until the system 100 is powered down.

Figure 2:
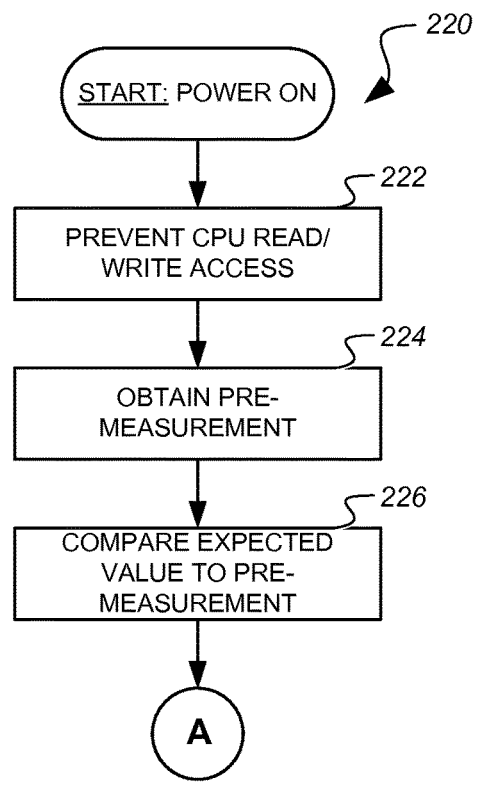
FIG. 2 is a flow diagram illustrating a routine that is executed, at least in part, by a nonvolatile memory device in accordance with an embodiment of the present technology.

FIG. 2 is a flow diagram illustrating a routine 220 that can be carried out, at least in part, by the NVM device 102 (FIG. 1) in accordance with an embodiment of the present technology. In one aspect of this embodiment, the controller module 105 executes at least a portion of the routine 220 via the processor 108 of the NVM device 102. The routine 220 starts when a computer system is powered on. In response to being powered on, the routine 220 proceeds to block 222 to prevent or block CPU access to the startup instructions. For example, the NVM device 102 can temporarily block the CPU 110 from read and/or write access of the main memory 103.

At block 224, the routine 220 instructs the NVM device 102 to pre-measure at least a portion of its contents (i.e., a pre-measurement of the CRTM). For example, the routine 220 can pre-measure the contents by calculating or otherwise obtaining a hash value. In some embodiments, after taking the pre-measurement, the routine 220 can instruct the NVM device 102 to cryptographically sign the pre-measurement. Once the NVM device 102 obtains the measurement or the cryptographically-signed measurement, the routine 220 can enable read and/or write access so that the CPU 110 can retrieve startup instructions to initialize system boot. In another embodiment, the NVM device 102 does not enable read and/or write access until a determination of trustworthiness is made, such as in embodiments where the NVM device 102 assesses its own trustworthiness.

At block 226, the routine 220 compares an expected value, such as a golden hash value, with the pre-measurement value to determine whether the non-volatile memory is trustworthy. In one embodiment, the CPU 110 can receive and decrypt the pre-measurement and then perform the comparison as part of the startup process. Alternately, the NVM device 102 can perform the comparison and flag itself according to whether it is trustworthy or untrustworthy (by, e.g., setting a register, storing a data bit, or otherwise indicating that it is trustworthy). As described in greater detail below, in some embodiments, if the nonvolatile memory is determined to be untrustworthy, the routine 220 can proceed to perform a remediation measure. In other embodiments, however, the routine 220 can simply identify that a potential problem exists, but choose not to take a remediation measure.

Figure 3:
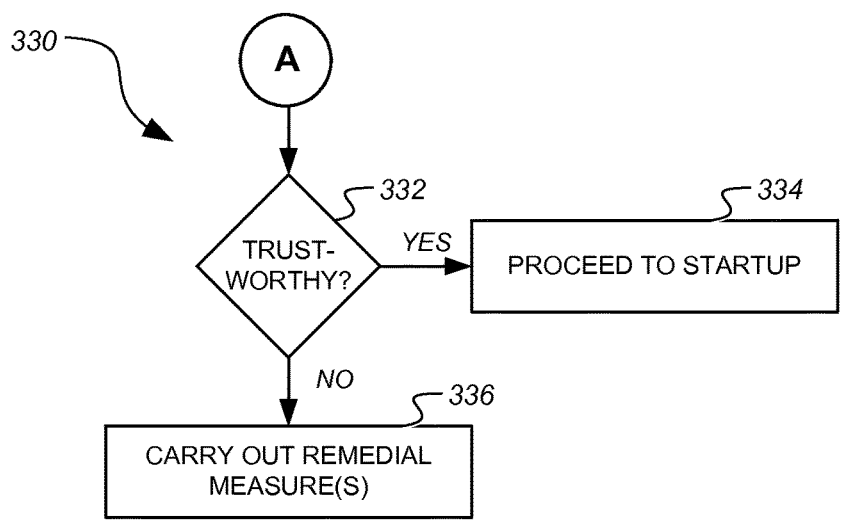
FIG. 3 is a flow diagram illustrating a routine that provides a remediation measure in accordance with an embodiment of the present technology.

FIG. 3 is a flow diagram illustrating a routine 330 for implementing one or more remediation measures in accordance with an embodiment of the present technology. The routine 330 can be executed, for example, by the CPU 110 and/or the controller module 105 of the NVM device 102. The routine 330 can begin after completing block 226 of FIG. 2. At decision block 332, if the routine 330 determines that the NVM device 102 is trustworthy, the routine 330 proceeds to block 334 to give the CPU 110 access to the startup instructions. If however, the NVM device 102 is untrustworthy, the routine 330 proceeds to block 336 to perform a remediation measure.

At block 336, the routine 330 carries out a remediation measure, such as entering a safe mode and/or warning a user (e.g., a system administrator) of a potential problem. In response to this warning, the user can have the option to correct the problem or to exit out of the safe mode and ignore the warning. If the user chooses the latter, a CPU can request for the NVM device 102 to load the untrustworthy (and potentially corrupted) boot block image. In some embodiments, the CPU 110 carries out the remediation measure. In other embodiments, the NVM device 102 carries out the remediation measure, such as by blocking CPU read and/or write access to at least a portion of the NVM device 102. In certain embodiments, in response to read or write requests from the CPU 110, the NVM device 102 can return static values, such as 0x00 or 0xFF, rather than the CPU-requested information. In another embodiment, the NVM device 102 can respond with an alternate boot block image, such as a back-up boot block image or a boot block image that initiates a safe mode.

Figure 4:
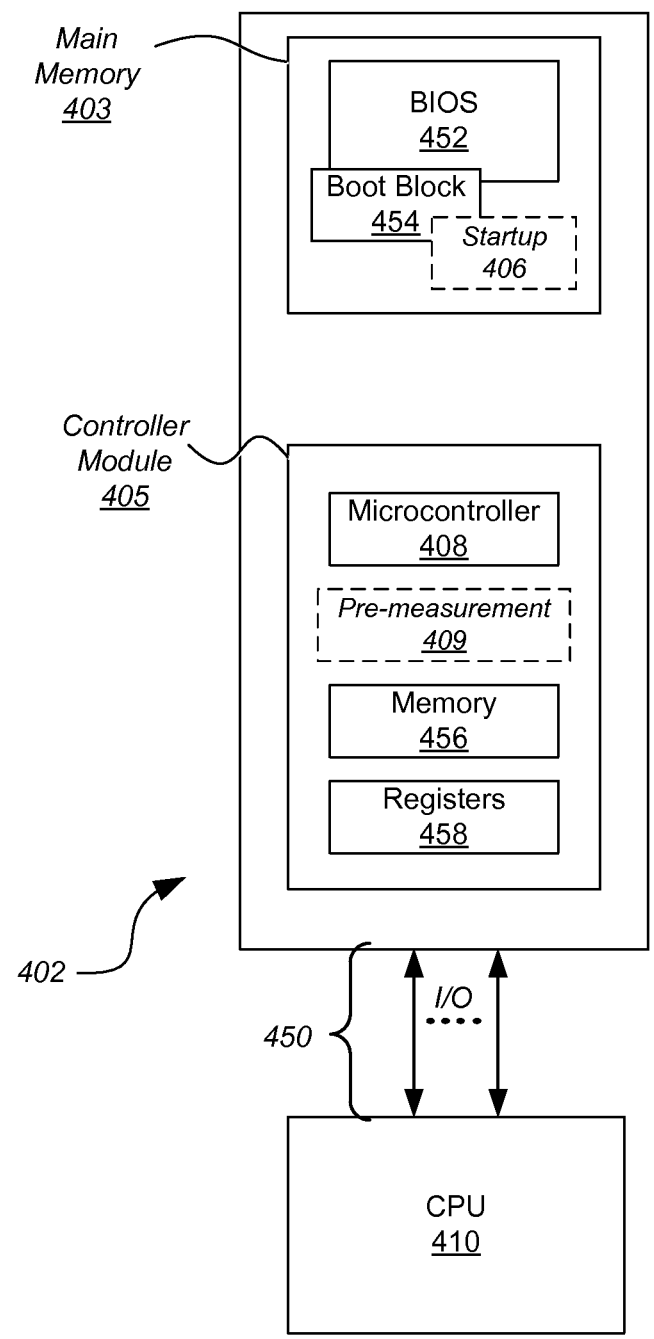
FIG. 4 is a block diagram of a nonvolatile memory device configured in accordance with another embodiment of the present technology.

FIG. 4 is a block diagram of a NVM device 402 configured in accordance with an embodiment of the present technology. The NVM device 402 includes a main memory 403 and a controller module 405 operably coupled to a CPU 410 via I/O lines 450, such as multi-bit data transfer lines.

The main memory 403 includes a BIOS 452 and a boot block 454 contained within the BIOS 452, with the boot block 454 storing startup instructions 406. The controller module 405 includes a memory block 456 configured to store pre-measurement instructions 409 and a microcontroller 408 configured to execute the pre-measurement instructions 409. Although not shown for purposes of clarity, the NVM device 402 can include other components, such as X-Y decoders, read/write lines, a power module, etc.

In one aspect of the embodiment shown in FIG. 4, the memory block 456 stores the pre-measurement instructions 409 as microcode. Unlike higher level languages (e.g., assembly code), microcode can be tedious to program (or re-program) and difficult to decode. Also, microcode is hardware specific and, thus, generally not executable on other system hardware, such as a CPU. Accordingly, when the pre-measurement instructions 409 are stored as microcode, they are not readily accessible or modifiable. Further, in some embodiments, the pre-measurement instructions 409 can be programmed with various cryptographic measures to provide further security.

In another aspect of this embodiment, the memory block 456 is a separate memory from the main memory 403. For example, the memory block 456 and the main memory 403 can be located on a separate portion of a chip. As such, the memory block 456 can employ a different data access scheme than the main memory 403 and thus provide further safeguards against subversive reprogramming. In some embodiments, the memory block 456 can include (unmodifiable) ROM. In this regard, the startup instructions 406 can receive programming updates, but the pre-measurement instructions 409 would not be capable of such updating once it is installed. In select embodiments, the controller module 405 can include resistors, fuse devices (e.g., anti-fuse devices), or other suitable components that permanently store the microcode or other values, such as an expected hash value.

In operation, when the microcontroller 408 is powered on, it proceeds to read and execute the pre-measurement instructions 409. In the illustrated embodiment, the pre-measurement instructions allows the nonvolatile memory to obtain and compare expected and measured values and to flag whether the NVM device 402 is trustworthy based on these values. For example, the NVM device 402 can include one or more memory registers 458 that store at least one datum indicative of whether the NVM device 402 is trustworthy. In other embodiments, and as discussed above, the CPU 410 can compare expected and measured values to one another. When the NVM device 402 flags itself as being trustworthy, the microcontroller 408 can grant read and/or write access to the CPU 410. However, if the NVM device memory 402 is not trustworthy, the microcontroller 408 can execute one or more remediation measures, such as any of those described above.

The nonvolatile memories, systems, and other components of the present technology can be incorporated into a variety of semiconductor devices (e.g., semiconductor dies, wafers, packages, etc.). In one embodiment, a controller module and a memory array can be located on the same chip. In another embodiment, a controller module and a memory array can be attached to a printed circuit board (PCB) and operably coupled to one another via the PCB. Also, nonvolatile memories, computer systems, and related components can be incorporated into any of a myriad of larger and/or more complex systems. Such systems can be configured to perform any of a wide variety of suitable computing, processing, storage, sensing, imaging, and/or other functions. Representative examples of such systems include, without limitation, computers and/or other data processors, such as desktop computers, laptop computers, Internet appliances, hand-held devices (e.g., palm-top computers, wearable computers, cellular or mobile phones, personal digital assistants, music players, etc.), tablets, multi-processor systems, processor-based or programmable consumer electronics, network computers, and minicomputers. Additional representative examples include lights, cameras, vehicles, etc.

In addition, the processes, routines, and logic flows described in this specification can be performed by a variety of programmable processors executing one or more computer programs (also known as a program, software, software application, script, code, etc.). For example, as described above a microcontroller can execute pre-measurement instructions to implement the routine 220 (FIG. 2). Further, a computer storage medium can store such computer programs and can include, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices). For example, a CD can store pre-measurement instructions. During manufacture, a computer can read the CD before or during the process to install the pre-measurement instructions in a nonvolatile memory.

From the foregoing, it will be appreciated that specific embodiments of the invention have been described herein for purposes of illustration, but well-known structures and functions have not been shown or described in detail to avoid unnecessarily obscuring the description of the embodiments of the invention. Where the context permits, singular or plural terms may also include the plural or singular term, respectively. While specific embodiments have been described above for purposes of illustration, various modifications may be made without deviating from the scope of the present technology. For example, the memory array of a nonvolatile memory can have a variety of configurations, including NOR, NAND, etc. In addition, aspects of the disclosure described in the context of particular embodiments may be combined or eliminated in other embodiments. For example, in some embodiments the security coprocessor 115 (FIG. 1) can be omitted. Further, while advantages associated with certain embodiments of the disclosure may have been described in the context of those embodiments, other embodiments may also exhibit such advantages, but not all embodiments need necessarily exhibit such advantages to fall within the scope of the disclosure. Accordingly, the present invention is not limited to the embodiments described above, which were provided for ease of understanding; rather, the invention includes any and all other embodiments defined by the claims.

I claim:

1. A computer system, comprising:
    a central processor (CPU); and
    a nonvolatile memory device operably coupled to the CPU, wherein the nonvolatile memory device includes memory and a controller operably coupled to the memory, wherein the memory stores boot block code and pre-measurement instructions, wherein the pre-measurement instructions are executable by the controller of the nonvolatile memory device upon startup, wherein the pre-measurement instructions are not executable by the CPU, and wherein the pre-measurement instructions
   direct the controller of the nonvolatile memory device to obtain a measurement of at least a portion of the boot block code stored in the memory, wherein the measurement is a measured value based on contents of the boot block code stored in the memory,
   direct the controller of the nonvolatile memory device to prevent read and write access by the CPU upon startup and at least until the measurement is obtained,
   direct the nonvolatile memory device to cryptographically sign the measurement, and
   provide the CPU access to the signed measurement to a component separate from the nonvolatile; and
a security coprocessor separate from the nonvolatile memory device and operably coupled to the CPU, wherein the CPU is configured to compare the measured value to an expected value provided by the security coprocessor to determine whether the nonvolatile memory device is trustworthy.

2. The system of claim 1 wherein the nonvolatile memory device is configured to prevent CPU access to the boot block code upon startup and at least until the measurement is cryptographically signed.

3. The system of claim 2 wherein:
the nonvolatile memory device stores the pre-measurement instructions in a dedicated portion of the memory; and
the nonvolatile memory device stores the startup instructions in a main portion of the memory separate from the dedicated portion of the memory.

4. The system of claim 1 wherein the nonvolatile memory device is further configured to flag itself as trustworthy or untrustworthy based on the determination of whether the nonvolatile memory device is trustworthy.

5. The system of claim 1 wherein the nonvolatile memory device is further configured to enable read and/or write access based on the determination of whether the nonvolatile memory device is trustworthy.

6. The system of claim 1 wherein the nonvolatile memory device is configured to determine whether the nonvolatile memory device is trustworthy, and wherein in response to the determination of whether the nonvolatile memory device is trustworthy, the nonvolatile memory device is configured to carry out a remediation measure that includes at least one of:
   notifying the CPU that at least a portion of the nonvolatile memory device is not trustworthy,
   disabling CPU read and/or write access, and
   loading alternate startup instructions in response to a request from the CPU.

7. The system of claim 1 wherein the nonvolatile memory device comprises a boot block, and wherein the nonvolatile memory device is configured to flag whether the boot block is trustworthy based on the measurement taken by the nonvolatile memory device.

8. The system of claim 1 wherein the nonvolatile memory device comprises a basic input/output system (BIOS), and wherein the nonvolatile memory device is configured to flag whether the BIOS is trustworthy based on the measurement taken by the nonvolatile memory device.

9. A method of initiating system boot in a computer system having a nonvolatile memory device operably coupled to a central processing unit (CPU), the method comprising:
   upon powering on a computer system, directing a controller of the nonvolatile memory device to perform operations based on pre-measurement instructions stored in a memory of the nonvolatile memory device, wherein the pre-measurement instructions are not executable by the CPU, and wherein the operations include
      obtaining a measured value from a portion of the nonvolatile memory device using a controller of the nonvolatile memory device, wherein the nonvolatile memory device stores boot block code, and wherein the measured value is indicative of whether the nonvolatile memory device is trustworthy,
      preventing CPU access to the boot block code stored in the nonvolatile memory device via the controller of the nonvolatile memory device at least until the measured value is obtained, and
      communicating the measured value to the CPU;
   obtaining an expected value from a security coprocessor separate from the nonvolatile memory device; and
   comparing the measured value to the expected value via the CPU to determine whether the nonvolatile device is trustworthy.

10. The method of claim 9, further comprising,
after comparing the measured value to the expected value, providing read and/or write access to the nonvolatile memory device in response to a request from the CPU.

11. A memory system comprising nonvolatile memory, a separate processor operably coupled to the nonvolatile memory, and a security coprocessor coupled to the separate processor, wherein the separate processor is independent of the nonvolatile memory, and wherein the nonvolatile memory comprises:
   a controller module including a microcontroller and a first memory configured to store microcode executable by the microcontroller that initiates pre-measurement instructions upon powering on the nonvolatile memory, wherein the microcode is not executable by a processor other than the microcontroller; and
   a second memory separate from the first memory and configured to store startup instructions executable by the separate processor, wherein the startup instructions include boot block code stored in the second memory, and
   wherein the pre-measurement instructions direct the microcontroller to (1) obtain a measurement of at least a portion of the boot block code stored in the second memory, (2) prevent access to the boot block code by the separate processor upon powering on the nonvolatile memory and at least until the measurement is obtained, and (3) provide the measurement to the separate processor to compare the measurement to an expected value stored in the security coprocessor to detect whether the nonvolatile memory is corrupted.

12. The memory system of claim 11 wherein the first memory is a read only memory (ROM).

13. The memory system of claim 11 wherein the startup instructions are encoded in program code other than microcode.

14. The memory system of claim 11 wherein the pre-measurement instructions include instructions that direct the nonvolatile memory to take a remediation measure in response to detecting that the nonvolatile memory is corrupted.

15. The memory system of claim 11 wherein the startup instructions are original startup instructions, and wherein:

at least one of the first memory and the second memory store alternate startup instructions; and upon determining that the original startup instructions are corrupted, the pre-measurement instructions instruct the microcontroller to provide alternate startup instructions in response to a request from the separate processor.

* * * * *

UNITED STATES PATENT AND TRADEMARK OFFICE
CERTIFICATE OF CORRECTION

PATENT NO. : 9,613,214 B2
APPLICATION NO. : 13/937887
DATED : April 4, 2017
INVENTOR(S) : Lance W. Dover Page 1 of 1

It is certified that error appears in the above-identified patent and that said Letters Patent is hereby corrected as shown below:

In the Claims

In Column 7, Line 16, in Claim 1, delete "from the nonvolatile" and insert -- from the nonvolatile memory --, therefor.

Signed and Sealed this
Twenty-eighth Day of May, 2019

Andrei Iancu
*Director of the United States Patent and Trademark Office*